3,032,392
MANUFACTURE OF CALCIUM BORATES
Nelson Perry Nies, Laguna Beach, Calif., and Godfrey Harold Bowden, Epsom, Surrey, England, assignors to United States Borax & Chemical Corporation, a corporation of Nevada
No Drawing. Filed Oct. 1, 1959, Ser. No. 843,620
Claims priority, application Great Britain Oct. 29, 1958
3 Claims. (Cl. 23—59)

This invention relates to the production of crystalline calcium borates, and more particularly to the production of crystalline calcium 1,1-borate tetrahydrate and hexahydrate.

There is a large potential demand for pure calcium borate hydrates by the glass industry, and also they are of great interest to the ceramic industry and in steel manufacture, as an alternative to the use of lime and boric acid. Calcium 1,1-borate (otherwise known as calcium metaborate) has a higher melting point (about 1,154° C.) than boric acid and sodium borates (the usual suppliers of $B_2O_3$ in glass), and gives a more uniform melt when fused with other higher melting point ingredients.

It is known that crystalline calcium 1,1-borate hexahydrate may be made by several methods, e.g. by the reaction in aqueous solution of borax with calcium oxide or hydroxide in the presence of sodium hydroxide. It is also known that calcium 1,1-borate tetrahydrate may be made by the reaction of borax and caustic soda in aqueous solution with calcium hydoxide. In addition, we have described, in our patent application Serial No. 829,956, a method of producing crystalline calcium metaborate (as the tetrahydrate or the hexahydrate) which comprises reacting together borax, sodium hydroxide, calcium hydroxide and a calcium salt, e.g. calcium sulphate, in an aqueous medium, and removing the crystals of hydrated calcium metaborate so obtained.

We have now evolved yet another process for the manufacture of calcium metaborate and particularly its hexahydrate.

According to the present invention, calcium metaborate is made by a method in which an aqueous mixture is prepared containing borax, calcium hydroxide or oxide, and one or more calcium salts, but containing substantially no caustic alkali, and after reaction calcium metaborate is crystallised out and separated. Calcium sulphate and calcium chloride are two examples of the calcium salts which may be used; calcium sulphate is normally a particularly convenient calcium salt to use. The word "borax" is used here and in the claims to denote any sodium 1:2-borate, irrespectively of its number of molecules of water of crystallisation (if any). The words "containing substantialy no caustic alkali" are used here and in the claims to indicate that no alkali-metal hydroxide is present in the mixture apart from the sodium hydroxide which may be thought of as being present in the borax.

The line (i.e. calcium hydroxide or oxide) used should be as freshly slaked or calcined respectively as possible, i.e. it should have as low a carbonate content as possible. Also both the lime and the calcium sulphate and/or other calcium salt(s) should be as finely-divided as possible, e.g. should comprise 80% to 90% of particles which can pass a 200-mesh British Standard sieve.

The reaction relied upon in the novel process may be represented, in the case in which the reactants are borax, calcium hydroxide and calcium sulphate, by the following equation (ignoring water of crystallisation:

$Na_2O.2B_2O_3 + Ca(OH)_2 + CaSO_4 = 2(CaO.B_2O_3) + Na_2SO_4 + H_2O$
(Borax)

The aqueous mixture referred to will normally have the physical form of a slurry, and the concentrations may indeed be so high as to give a slury that is only stirred with difficulty. The reactants may be added in any order, but are preferably well stirred during the period during which the reaction is proceeding. The reaction will proceed of its own accord at substantially any ordinary temperature, that is to say, any temperature within the range 0° C. to 100° C., and the novel process may therefore be conveniently operated at room temperature; higher temperatures, i.e. temperatures materially greater than 30° C. and up to 100° C., favour the production of the tetrahydrate. However, in order to obtain the best results, the proportions of the reactants are preferably so chosen that the weight of calcium hydroxide (or oxide) present is slightly in excess (e.g. up to 10% excess) of that called for by the equation given above, and the weight of the calcium sulphate and/or other calcium salt(s) present is slightly less (e.g. up to 10% less) than that called for by this equation; the use of such proportions will in general lead to good crystallisation and a product having a low content of non-borate anion(s) derived from the calcium salt(s) used, e.g. a sulphate content corresponding to 0.1% of $SO_3$. At the same time it is also preferable for high yields that the proportions of reactants should be such that the ratio $CaO:B_2O_3$ in the product wil be unity or slightly greater. The time to be allowed for the conversion of a satisfactory proportion of material is usually up to two hours, assuming the process is operated at room temperature, e.g. about 15° C.

The reaction relied upon in the novel process in exothermic, and the temperature of the mixture is therefore liable to rise during the course of the reaction. It has been found that crystallisation is difficult at temperatures of about 25° C. to 30° C., and accordingly it is normally desirable, when the hexahydrate is being produced, to avoid such temperatures being reached.

As already specified, the calcium metaborate is crystallised from the aqueous reaction mixture in question, and the reaction mixture may if desired be "seeded" or "inoculated" with smal calcium metaborate tetrahydrate or hexahydrate crystals, according to whther the tetrahydrate or the hexahydrate is desired as the product. As already mentioned higher temperatures, i.e. temperatures materially greater than 30° C. and up to 100° C., favour the production of the tetrahydrate. For the production of the hexahydrate, temperatures of 10° C. to 20° C. are to be preferred.

The solution that remains after the removal of the calcium metaborate contains the sodium salt(s), e.g. sodium sulphate, formed in the reaction and usually also contains a small proportion of boric oxide, e.g. about 5 grams per litre. This residual solution may if desired be discarded, the value of the substances present in it being relatively small, but it is also possible to recycle the solution, i.e. to use it instead of water in preparing a new reaction mixture, and so to avoid losing the boric oxide present in it. However, if the recycling of the residual solution is to be repeated indefinitely removal of soluble sodium salts produced in the reaction should be effected at suitable intervals by fractional crystallisation; methods for the removal of sodium sulphate, of "desulphation," for instance, are known (see for example United States patent specifications Nos. 2,637,626, 2,746,841 and 2,089,557).

The novel process has the following particular advantages:

(1) It can be operated with cheap starting materials, e.g. borax, lime and gypsum. However, it will be understood that there is a degree of correspondence between the purity of the starting materials and the purity of the product.

(2) It can give high yields per unit volume of reaction mixture.

(3) No sodium borate liquors of relatively high viscosity need be manipulated.

(4) Though it can be operated cyclically, as already indicated it is especially well suited to batch-wise operation by reason of the expendability of the residual solution, which, as mentioned earlier, contains merely some sodium salt(s), e.g. sodium sulphate, and a small proportion of boric oxide.

(5) It is a relatively quick process, and therefore makes efficient use of equipment.

(6) It does not necessarily entail the use of temperatures above room temperatures.

The following example illustrates the invention.

*Example*

230 grams of borax ($Na_2O.2B_2O_3.10H_2O$) were added at normal temperatures to a slurry consisting of 47.0 grams of finely-divided calcium hydroxide and 98.5 grams of finely-divided calcium sulphate dihydrate in one litre of water.

The mixture was stirred, and one gram of calcium metaborate hexahydrate was added as "seed." The mixture was then stirred for 2 hours. At the end of this time, essentially all of the calcium hydroxide and calcium sulphate had reacted and calcium metaborate hexahydrate remained. The product was washed by decantation, filtered from the wash liquors, and dried, and was found to be essentially crystalline calcium metaborate hexahydrate, having a $CaO:B_2O_3$ ratio of 1.08:1.00.

The procedure was repeated with 115 lbs. of borax, 23.5 lbs. of calcium hydroxide, 49.25 lbs. of calcium sulphate dihydrate, and 500 lbs. of water. Similar results were obtained.

We claim:

1. The method of making crystalline calcium metaborate tetrahydrate according to the general reaction $Na_2O.2B_2O_3 + Ca(OH)_2 + CaSO_4$
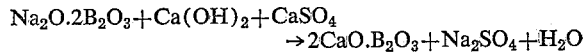
$\rightarrow 2CaO.B_2O_3 + Na_2SO_4 + H_2O$ which comprises making a reaction mass consisting essentially of an aqueous slurry of sodium 1:2-borate, calcium sulfate and calcium hydroxide, said calcium hydroxide present in an amount of from about stoichiometric to about 10% in excess of the stoichiometric amount, the calcium sulfate present in an amount of from about 10% less than stoichiometric to about the stoichiometric amount and the sodium 1:2-borate present in an amount such that the product has a $CaO:B_2O_3$ ratio of from about 1:1 to about 1.1:1, stirring said slurry until the reaction is substantially complete, seeding the reaction mass with crystals of calcium metaborate tetrahydrate and crystallizing calcium metaborate tetrahydrate from the reaction mass at a temperature of from about 30° C. to about 100° C.

2. The method of making crystalline calcium metaborate hexahydrate according to the general reaction $Na_2O.2B_2O_3 + Ca(OH)_2 + CaSO_4$
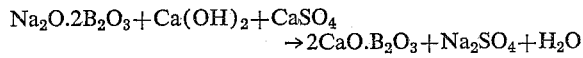
$\rightarrow 2CaO.B_2O_3 + Na_2SO_4 + H_2O$ which comprises making a reaction mass consisting essentially of an aqueous slurry of sodium 1:2-borate, calcium sulfate and calcium hydroxide, said calcium hydroxide present in an amount of from about stoichiometric to about 10% in excess of the stoichiometric amount, the calcium sulfate present in an amount of from about 10% less than stoichiometric to about the stoichiometric amount and the sodium 1:2-borate present in an amount such that the product has a $CaO:B_2O_3$ ratio of from about 1:1 to about 1.1:1, stirring said slurry until the reaction is substantially complete, seeding the reaction mass with crystals of calcium metaborate hexahydrate and crystallizing calcium metaborate hexahydrate from the reaction mass at a temperature of from about 10° C. to about 20° C.

3. The method of making hydrated crystalline calcium metaborate according to the general reaction $Na_2O.2B_2O_3 + Ca(OH)_2 + CaSO_4$
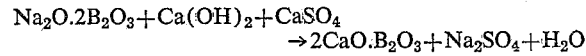
$\rightarrow 2CaO.B_2O_3 + Na_2SO_4 + H_2O$ which comprises making a reaction mass consisting essentially of a concentrated aqueous slurry of sodium 1:2-borate, calcium sulfate and calcium hydroxide, said calcium hydroxide present in an amount from about stoichiometric to about 10% in excess of the stiochiometric amount, the calcium sulfate present in an amount of from about 10% less than stiochiometric to about stoichiometric amount, and the sodium 1:2-borate present in an amount such that the product has a $CaO:B_2O_3$ ratio of from about 1:1 to about 1.1:1, stirring said slurry until a reaction is substantially complete, and said calcium metaborate crystallizes from said reaction mass.

References Cited in the file of this patent

UNITED STATES PATENTS 1,892,341   Hackspill _____ Dec. 27, 1932

FOREIGN PATENTS 352,137   Great Britain _____ July 9, 1931

OTHER REFERENCES

Mellor: "A Comprehensive Treatise on Inorganic and Theoretical Chemistry," vol. V (1924), Longmans, Green and Co., pp. 87–88.

UNITED STATES PATENT OFFICE
CERTIFICATION OF CORRECTION

Patent No. 3,032,392

May 1, 1962

Nelson Perry Nies et al.

It is hereby certified that error appears in the above numbered patent requiring correction and that the said Letters Patent should read as corrected below.

Column 1, line 58, after "borax" insert -- itself --; column 2, line 3, for "slury" read -- slurry --; line 27, for "wil" read -- will --; line 31, for "in", second occurrence, read -- is --; line 41, for "smal" read -- small --; same column 2, line 42, for "whther" read -- whether --; column 3, lines 39 and 40, and column 4, lines 7 and 8, and lines 27 and 28, the equations, each occurrence, should appear as shown below instead of as in the patent:

$$Na_2O \cdot 2B_2O_3 + Ca(OH)_2 + CaSO_4 \longrightarrow 2CaO \cdot B_2O_3 + Na_2SO_4 + H_2O$$

same column 4, lines 33 and 35, for "stiochiometric", each occurrence, read -- stoichiometric --.

Signed and sealed this 11th day of September 1962.

SEAL)
Attest:

ERNEST W. SWIDER
Attesting Officer

DAVID L. LADD
Commissioner of Patents